United States Patent
Corbin et al.

(10) Patent No.: US 9,798,681 B2
(45) Date of Patent: *Oct. 24, 2017

(54) HDMI EXTENDER WITH BIDIRECTIONAL POWER OVER TWISTED PAIR

(71) Applicants: O. Bradley Corbin, Amelia Island, FL (US); Dezhi Liu, Shenzhen (CN)

(72) Inventors: O. Bradley Corbin, Amelia Island, FL (US); Dezhi Liu, Shenzhen (CN)

(73) Assignees: Vanco International, LLC, Batavia (IL); Schenzhen Hollyland Technology Co., Ltd., Nanshan, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/178,876

(22) Filed: Jun. 10, 2016

(65) Prior Publication Data
US 2017/0277642 A1 Sep. 28, 2017

Related U.S. Application Data

(63) Continuation of application No. 15/092,714, filed on Apr. 7, 2016.
(Continued)

(51) Int. Cl.
| | |
|---|---|
| *H04L 29/06* | (2006.01) |
| *G06F 13/10* | (2006.01) |
| *H04L 9/12* | (2006.01) |
| *G06F 13/40* | (2006.01) |
| *H04N 21/4363* | (2011.01) |

(Continued)

(52) U.S. Cl.
CPC ........ *G06F 13/102* (2013.01); *G06F 13/4068* (2013.01); *H04L 9/12* (2013.01); *H04L 69/16* (2013.01); *H04N 21/43615* (2013.01); *H04N 21/43635* (2013.01); *H04N 21/4402* (2013.01);
(Continued)

(58) Field of Classification Search
None
See application file for complete search history.

(56) References Cited

U.S. PATENT DOCUMENTS

| | | | |
|---|---|---|---|
| 9,317,847 B2 * | 4/2016 | Candelore | .......... G06Q 20/3224 |
| 2006/0010274 A1 | 1/2006 | Olson | |

(Continued)

OTHER PUBLICATIONS

Kabir, M. Humayun; Huyn-Wook, Kim; Sung-Hyum, Yang. The Development of a Modular type Platform for Home Network Service. 2012 International Conference on Informatics, Electronics & Vision (ICIEV). http://ieeexplore.ieee.org/stamp/stamp.jsp?arnumber=6317414.*

(Continued)

*Primary Examiner* — Jeremiah Avery
(74) *Attorney, Agent, or Firm* — Thomas | Horstemeyer, LLP

(57) ABSTRACT

Disclosed are various embodiments of transmit and receive connectivity devices that receive a media signal from a source device coupled to the HDMI port and to convert the media signal to a converged media signal based on a converged signal specification. The converged media signal can be transmitted between the transmit and receive connectivity devices through a multi-position multi-contact port. The converged media signal can be converted to a media signal based on the converged signal specification. The converted media signal can be output to a sink device via an HDMI port.

20 Claims, 11 Drawing Sheets

Related U.S. Application Data

(60) Provisional application No. 62/313,305, filed on Mar. 25, 2016, provisional application No. 62/143,907, filed on Apr. 7, 2015.

(51) Int. Cl.
*H04N 21/436* (2011.01)
*H04N 21/4402* (2011.01)
*H04N 21/4405* (2011.01)
*H04N 21/4408* (2011.01)

(52) U.S. Cl.
CPC ..... *H04N 21/4405* (2013.01); *H04N 21/4408* (2013.01)

(56) References Cited

U.S. PATENT DOCUMENTS

| | | | |
|---|---|---|---|
| 2006/0036788 A1 | 2/2006 | Galang | |
| 2009/0013372 A1 | 1/2009 | Oakes | |
| 2009/0049498 A1 | 2/2009 | Li | |
| 2010/0259691 A1 | 10/2010 | Sasazaki | |
| 2011/0126005 A1* | 5/2011 | Carpenter | G06F 13/385 713/158 |
| 2011/0208980 A1* | 8/2011 | Brooks | G06F 1/266 713/300 |
| 2012/0039051 A1 | 2/2012 | Chang | |
| 2013/0201316 A1* | 8/2013 | Binder | H04L 67/12 348/77 |
| 2014/0254434 A1* | 9/2014 | Jain | H04L 67/306 370/259 |
| 2014/0273852 A1* | 9/2014 | McCormack | H04B 5/0031 455/41.2 |
| 2015/0067203 A1* | 3/2015 | Whitaker | G06F 13/4027 710/63 |
| 2015/0172600 A1* | 6/2015 | Nanda | H04N 7/1675 380/201 |
| 2015/0271557 A1* | 9/2015 | Tabe | H04N 21/4788 725/14 |
| 2015/0277503 A1* | 10/2015 | Eremenko | G06F 1/1658 361/679.4 |

OTHER PUBLICATIONS

Patnaik, Abhishek; Zhang, YaoJiang; De, Souyma; Pommerenke, David; Wang, Chen; Jackson, Charles. A Method to Quantify the Coupling Between DVI and HDMI Connectors. 2014 IEEE International Symposium on Electromagnetic Compatibility (EMC). http://ieeexplore.ieee.org/stamp/stamp.jsp?arnumber=6898986.*

Non-Final Office Action mailed Apr. 22, 2016 for U.S. Appl. No. 14/463,849.

Response to Non-Final Office Action filed Jul. 22, 2016 for U.S. Appl. No. 14/463,849.

Final Office Action mailed Nov. 3, 2016 for Application U.S. Appl. No. 14/463,849.

Response to Final Office Action filed Feb. 1, 2017 for U.S. Appl. No. 14/463,849.

* cited by examiner

HDMI EXTENDER WITH BIDIRECTIONAL POWER OVER TWISTED PAIR

CROSS-REFERENCE TO RELATED APPLICATIONS

This application claims the benefit of copending U.S. patent application Ser. No. 15/092,714, entitled "HDMI EXTENDER WITH BIDIRECTIONAL POWER OVER TWISTED PAIR, filed on Apr. 7, 2016, which claims priority to U.S. Provisional Application No. 62/143,907 entitled "HDMI EXTENDER WITH BIDIRECTIONAL POWER OVER TWISTED PAIR," filed on Apr. 7, 2015, and U.S. Provisional Application No. 62/313,305 entitled "TRANSMITTING ENCRYPTED MULTIMEDIA SIGNALS," filed on Mar. 25, 2016, both of which are hereby incorporated by reference in their entirety.

BACKGROUND

High Definition Media Interface (HDMI) is transmission interface defined by the HDMI Licensing, LLC Organization. HDMI is a common audiovisual standard for the transmission of high definition video, audio, and related media signals. In this context, HDMI defines an interface for transferring uncompressed video and compressed or uncompressed audio data from a source device to a sink device. HDMI has generally been relied upon as a digital replacement for conventional analog video standards.

The HDMI can simultaneously transmit uncompressed digital video and audio data streams. Currently, HDMI may be the most widely used audio and video transmission interface in consumer electronics. HDMI is compatible with the HDCP (High-bandwidth Digital Content Protection) digital rights management technology, and provides an interface between any compatible digital source device, such as a set-top box, a Blu-ray® digital-versatile disc (DVD) player, an HD DVD player, a personal computer, or a video game console, for example, and a compatible sink device, such as a digital television, computer monitor, display, etc.

In the standard HDMI, a signal line for Transition Minimized Differential Signaling (TMDS) can be used for transmitting audio data, video data, and associated control information; a signal line for Display Data Channel (DDC) can be used for transmitting the Extended Display Identification Data (EDID) and the information associated with the HDCP key; a signal line for Consumer Electronic Control (CEC) can be used for transmitting the operation control data between equipment; a signal line for Hot Plug Detect (HPD) can be used for transmitting information associated with the connectivity state of the equipment; and a 5 voltage power signal line and a common ground signal line can be used for providing an auxiliary power supply to the receiving device and providing a unified reference ground level for all single-ended signals.

SUMMARY

These and other aspects, objects, features, and embodiments will become apparent to a person of ordinary skill in the art upon consideration of the following detailed description of illustrative embodiments exemplifying the best mode as presently perceived.

For video sharing among multi-rooms in a family or in some industrial applications, a technology for long-distance transmitting a High Definition Media (HDM) signal may need to be relatively convenient for wiring. CAT5e cable or CAT6 cable can be used to extend the transmission of a HDM signals. In some embodiments, preexisting CAT5e or CAT6 cables can be installed within a connectivity environment. In contrast to the HDMI cable, the CAT5e cable or CAT6 cable can provide advantages when transmitting over long distance. For example, the CAT5e or CAT6 cable can provide lower cost or easier wiring. A CAT5E or CAT6 cable can also be shared with other services.

The standard CAT5e cable or CAT6 cable may contain four twisted pair cables. According to one embodiment, extender devices can use four twisted pair cables to transmit a TMDS signal. The receive extender device can perform equalization, amplification, or clock recovery on the TMDS signal, in such a way to improve the TMDS transmission over a 50-meter distance. However, the operator or designer may still need to consider how to transmit the DDC signal, the CEC signal, and the HPD signal, how to implement the HDCP copyright protection mechanisms, how to transmit bi-directional infrared (IR) control signal between the transmitter of the extend equipment and the receiver of the extend equipment over a long distance between the transmitter and receiver, and so on.

BRIEF DESCRIPTION OF THE DRAWINGS

For a more complete understanding of the embodiments and the advantages thereof, reference is now made to the following description, in conjunction with the accompanying figures briefly described as follows.

Figure 1:
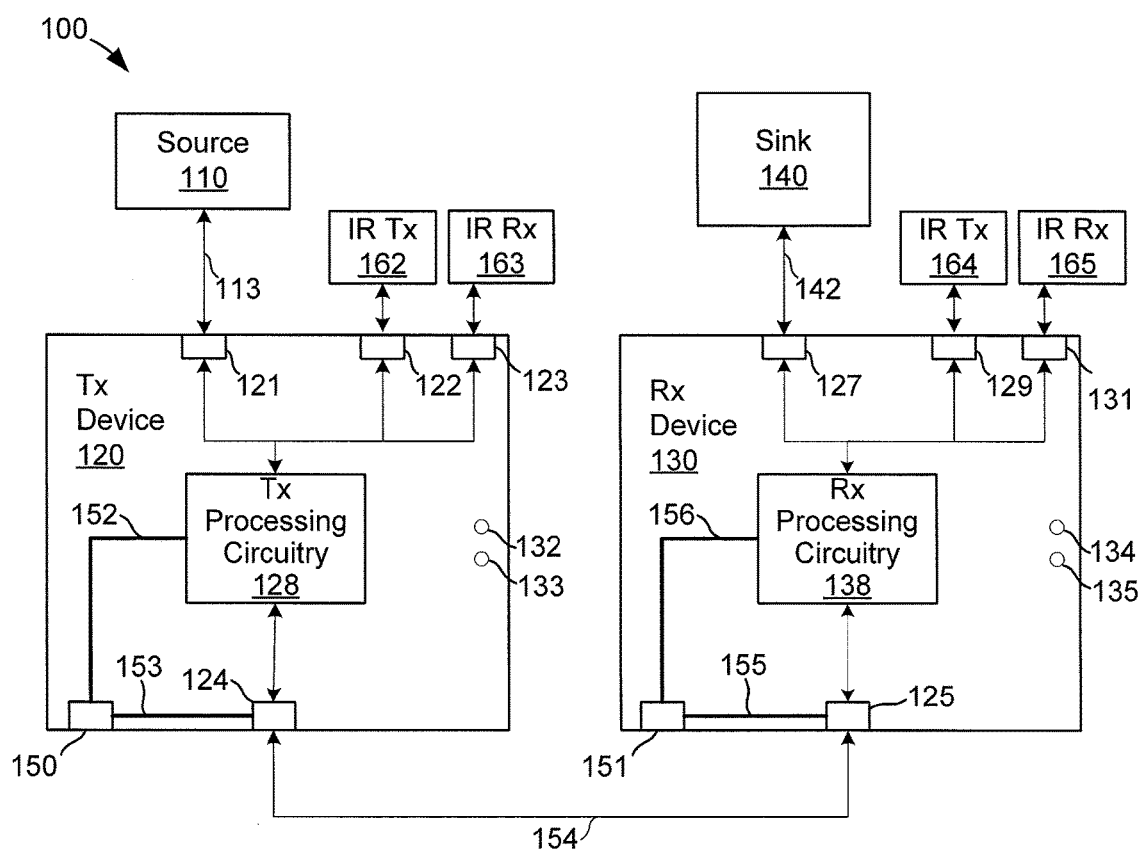
FIG. 1 is a drawing that depicts a connectivity system according to an example embodiment of the present disclosure.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

In the following paragraphs, the embodiments are described in further detail by way of example with reference to the attached drawings. In the description, well known components, methods, and/or processing techniques are omitted or briefly described so as not to obscure the embodiments. As used herein, the "present invention" refers to any one of the embodiments of the invention described herein and any equivalents. Furthermore, reference to various feature(s) of the "present invention" is not to suggest that all embodiments must include the referenced feature(s).

Among embodiments, some aspects of the present invention are implemented by a computer program executed by one or more processors, as described and illustrated. As would be apparent to one having ordinary skill in the art, the present invention may be implemented, at least in part, by computer-readable instructions in various forms, and the present invention is not intended to be limiting to a particular set or sequence of instructions executed by the processor.

The embodiments described herein are not limited in application to the details set forth in the following description or illustrated in the drawings. The invention is capable of other embodiments and of being practiced or carried out in various ways. Also, the phraseology and terminology used herein is for the purpose of description and should not be regarded as limiting. The use of "including," "comprising," or "having" and variations thereof herein is meant to encompass the items listed thereafter, additional items, and equivalents thereof. The terms "connected" and "coupled" are used broadly and encompass both direct and indirect connections and couplings. In addition, the terms "connected" and "coupled" are not limited to electrical, physical, or mechanical connections or couplings. As used herein the terms "machine," "computer," "server," and "work station" are not limited to a device with a single processor, but may encompass multiple devices (e.g., computers) linked in a system, devices with multiple processors, special purpose devices, devices with various peripherals and input and output devices, software acting as a computer or server, and combinations of the above.

Turning now to the drawings, exemplary embodiments are described in detail. With reference to FIG. 1, shown is an extender system 100, including a media signal source device 110, a transmit extender device 120, a receive extender device 130, a sink device 140, a first IR transmit module 162, a first IR receive module 163, a second IR transmit module 164, and a second IR receive module 165. In some embodiments, the transmit extender device 120 and receive extender device 130 can be the same device. As such, any reference herein to a feature of transmit or receive extender device 120 or 130 can be similarly implemented in the other device. The first IR transmit module 162 and the first IR receive module 163 can be combined as a first IR transmit/receive module. The second IR transmit module 164 and second IR receive module can be combined as a second IR transmit/receive module.

The media signal source device 110 can be electrically coupled to the transmit extender device 120 at a source port 121 by way of a cable 113, such as an HDMI cable, a DVI cable, or other transmission mediums. The media signal source device 110 can output a media signal, such as an HDM signal, a digital video (DV) signal, or other media signals. The media signal output by the media signal source device 110 can be encrypted, for example, the media signal may comply with the high-bandwidth digital content protection (HDCP) specification. In one embodiment, the HDCP standard encryption can be used in addition to another encryption method. The media signal can be transmitted through one or more TMDS signal lines of cable 113.

Beside the source port 121, the transmit extender device 120 further includes an IR transmit port 122, an IR receive port 123, a power input connector 150, a video indicator light 132, a power indicator 133, and a network port 124. The network port 124 can include an RJ45 port having eight contacts, and the source port 121 can include an HDMI port having nineteen contacts, a DVI port, or another interface. In other embodiments, the network port 125 and the source port 121 can have greater or fewer contacts.

The first and second IR receive and transmit modules 162, 163, 164, and 165 can be configured to receive, transmit, and relay (e.g., pass-through) IR control signals to and from IR remote controls and other devices which include IR receivers and transmitters for control. In other words, in addition to extending media signals from the media signal source device 110 to the sink device 140, the extender system 100 can also extend IR control signals between the transmit extender device 120 and the receive extender device 130.

The transmit extender device 120 can include transmit processing circuitry 128. It should be appreciated that the transmit processing circuitry 128 can include a combination of different types of circuitry, including various types of integrated processing circuits, driver circuits, memory, etc. Generally, any combination of circuitry or logic suitable to achieve the media signal conversion and HDMI extension features described herein may be relied upon. The transmit processing circuitry 128 can include power circuitry configured to receive an incoming power signal on the power input connector 150 from a power supply. The transmit processing circuitry 128 can provide a power signal to receive extender device 130 via the network port 124 and the cable 154. In some embodiments, the transmitter processing circuitry 128 can include power circuitry configured to receive an incoming power signal from receive extender device 130 through the network port 124 and the cable 154. The transmit processing circuitry 128 can include encryption and decryption hardware.

The transmit processing circuitry 128 can be configured to receive a media signal, such as one or more media signals from the media signal source device 110. The transmit processing circuitry 128 can be configured to receive IR control signals from the first IR receive/transmit module 162. The IR control signals can be packet data from a computing device. The transmit processing circuitry 128 can convert the media signals to a converged media signal based on a converged signal specification. As an example, the transmit processing circuitry 128 can include a computing device, and the computing device can execute software to convert a media signal to a converged media signal based on the converged signal specification.

In some embodiments, the converted signal specification can be one or more of TCP/IP or UDP/IP. In these embodiments, the one or more media signals can be converted from 10 bit TMDS data signals to 8 bit data packets by transmit processing circuitry 128 and transmitted through network port 125. For example, because TMDS contains only 8 bits of media data within the 10 bit TMDS signal, the transmit processing circuitry 128 can extract the 8 bits of media data from the 10 bit TMDS signal and transmit the media data in 8 bit TCP or UDP packets.

As another example, the transmit processing circuitry 128 can package the individual 10 bit TMDS data chunks into 16 bit aligned data packets. In yet another example, the transmit processing circuitry 128 can package multiple 10 bit TMDS data chunks into multiple data packets without regard for bit alignment, for example, placing eight 10 bit TMDS data chunks into ten 8 bit data blocks and transmitting the data via TCP and/or UDP. In this context, it should be appreciated that the converged media signal can take on signal level, timing, and/or protocol characteristics different from those of the original signals from the media signal source device 110, the first IR receive/transmit module 162/163, and/or the computing device, individually. Data describing the characteristics, such as signal level, timing, and other protocol characteristics, can be embedded in data packets transmitted over cable 154. The data describing the characteristics can be used to recreate a signal with the same signal level, timing, and protocol characteristics, for example, by the receive processing circuitry 138.

In one embodiment, the transmit extender device 120 can be configured to support the extended transmission of full uncompressed high definition video and audio, along with various control signals such as CEC and IR.

The transmit extender device 120 can be coupled to the receive extender device 130 by cable 154. The receive extender device 130 can be referred to as a sink device when discussed in relation to the transmit extender device 120. The transmit extender device 120 can be referred to as a source device when discussed in relation to the receive extender device 130. The cable 154 can be embodied as a signal cable including four twisted pairs of conductors, such as a category 5e, 6, 6a, or 7 cable, for example, among other similar, suitable cables (e.g., "a twisted pair cable"). The transmit extender device 120 can also transmit or receive power via cable 154.

One of the four twisted pairs of conductors can be connected to a power supply, and a second twisted pair can be connected to a ground. For example, the power input connector 150 can be coupled to power circuitry (not shown) configured to create a potential difference between the twisted pair connected to pins 1 and 2 of the network port 124 and the twisted pair connected to pins 7 and 8 of network port 124. The transmit extender device 120 can also receive a power signal and ground from cable 154 on two twisted pairs of conductors. When power and ground are supplied via the cable 154, the transmit extender device 120 does not require a power supply connected to power input connector 150. The voltage across the twisted pairs of conductors can range from 10 to 20 volts. In one embodiment, the voltage is 12 volts.

The cables 113 and 142 can be embodied as an HDMI cable compliant with at least one of the HDMI specifications (e.g., 1.1-1.4 or after) or HDMI compliance testing specifications (e.g., 1.1-1.4 or after) (i.e., "an HMDI cable"). Further, the cables 113 and 142 can be embodied as either a standard or category 1 cable or a high speed category 2 cable. Cables 113 and 142 can include an Ethernet channel and audio return channel. According to one embodiment, depending upon the category or quality of the cables 113 and 142, the cables 113 and 142 can range up to about 150 feet in length.

The sink device 140 can be electrically coupled to the receive extender device 130 at a sink port 127 through a cable 142, for example an HDMI cable. Beside the sink port 127, the receive extender device 130 can further include an IR receive port 131, an IR transmit port 129, a power status indicator 134, a video status indicator 135, a power connection port 126, and a network port 141.

The receive extender device 130 can receive processing circuitry 138. It should be appreciated that the receiver processing circuitry 138 can include a combination of different types of circuitry, including various types of integrated processing circuits, driver circuits, memory, etc. Generally, any combination of circuitry or logic suitable to achieve the media signal conversion and HDMI extension features described herein can be relied upon. The receiver processing circuitry 138 can include power circuitry configured to receive an incoming power signal on power input connector 151 from a power supply. The receive processing circuitry 138 can provide a power signal to transmit extender device 120 via network port 125 and cable 154. In some embodiments, the receiver processing circuitry 138 can include power circuitry configured to receive an incoming power signal from transmit extender device 120 via network port 125 and cable 154.

The receive processing circuitry 138 can be configured to receive a converged media signal over the network port 141 and to convert the converged media signal to one or more media signals for output to the sink device 140. The receive processing circuitry 138 can be configured to base the conversion of the converged media signal to one or more media signals on a converged signal specification. In some embodiments, the converted signal specification can be one or more of TCP/IP or UDP/IP. In these embodiments, the one or more media data packets can be received via the network port 141 and converted from 8 bit data packets to 10 bit TMDS data signals by receive processing circuitry 138 and output via the sink port 127. For example, because TMDS contains only 8 bits of media data within the 10 bit TMDS signal, the receive processing circuitry 138 can process the TCP and/or UDP data packets by converting each 8 bit packet of media data into a 10 bit TMDS signal and output the TMDS signal via the sink port 127.

As another example, the receive processing circuitry 138 can extract the individual 10 bit TMDS data chunks from 16 bit aligned data packets. In yet another example, the receive processing circuitry 138 can extract multiple 10 bit TMDS data chunks from multiple data packets without regard for bit alignment, such as mapping ten 8 bit data blocks to eight 10 bit TMDS data chunks. In this context, it should be appreciated that the converged media signal can have signal level, timing, and/or protocol characteristics different from those of the media signals for output. In one embodiment, the receive processing circuitry 138 can extract data from the converged media signal, the data describing the characteristics of an original media signal received by the transmit processing circuitry 128. The receive processing circuitry 138 can utilize the data describing the characteristics to generate the media signal with characteristics corresponding to the data. As illustrated in FIG. 1, the network cable 154 can be coupled to both the network port 124 of the transmit extender device 120 and the network port 125 of the receive extender device 130.

The receive processing circuitry 138 can include a data recovery circuit. According to one example, the data recovery circuit can be a PS8401A available from the Parade Technologies, Ltd. In one embodiment, data recovery circuit contains a clock and data recovery phase locked-loop (CDR PLL). The data recovery circuit can eliminate clock jitter or data jitter in long-distance transmissions, and improve the signal quality of the TMDS signal for outputting to encryption circuitry.

Figure 2:
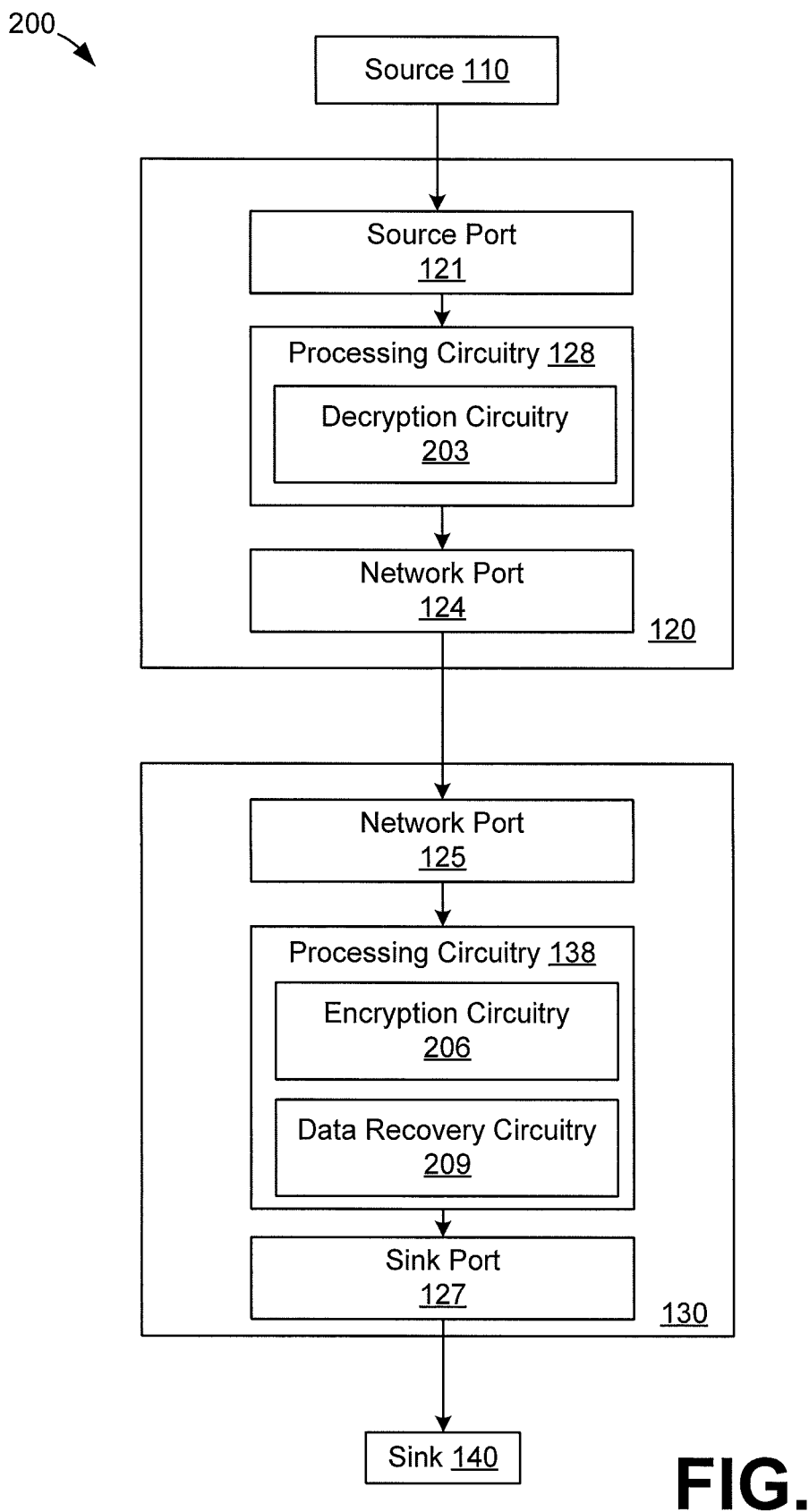
FIG. 2 is a block diagram of a signal traveling through a connectivity system according to an example of the present disclosure.

With reference to FIG. 2, shown is a block diagram 200 of a signal traveling through a connectivity system according to an example embodiment of the present disclosure. The block diagram 200 includes a media signal source device 110, a transmit extender device 120, a receive extender device 130, and a sink device 140. The transmit processing circuitry 128 can include decryption circuitry 203. The receive processing circuitry 138 can include encryption circuitry 206 and data recovery circuitry 209.

The media signal source device 110 can generate a media signal and output the media signal to the source port 121 of the transmit extender device 120. The media signal source device 110 can generate the media signal based on a content source, such as an internet media stream, a television broadcast, a DVD, a Blu-ray, a content server, or other media source. The generated media signal can be an encrypted. An encrypted media signal can be encrypted to comply with the HDCP specification.

The decryption circuitry 203 can receive the encrypted media signal from the media signal source device 110 through the source port 121. The decryption circuitry 203 can convert the encrypted media signal into a decrypted media signal. In one embodiment, the decryption circuitry 203 can be a hardware circuit configured to decrypt an HDCP encrypted media signal. In another embodiment, the decryption circuitry 203 can be a processor executing software configured to decrypt an HDCP encrypted media signal.

The transmit processing circuitry 128 can transmit the decrypted media signal to the receive processing circuitry 138 through the network port 124 and the network port 125. The data recovery circuitry 209 can perform a data recovery process on the decrypted media signal to generate a recovered media signal. An output of the data recovery circuitry 209 can provide the recovered media signal to an input of the encryption circuitry 206. The encryption circuitry 206 can encrypt the recovered media signal to generate a re-encrypted media signal. In some embodiments, the re-encrypted media signal generated by the encryption circuitry 206 is substantially similar to the encrypted media signal generated by the media signal source device 110. As an example, the encryption circuitry 206 can generate a re-encrypted media signal using the same, or substantially similar, algorithm used to encrypt the media signal generated by the media signal source device 110.

In some embodiments, the encryption circuitry 206 can use the same, or substantially similar, algorithm to generate a re-encrypted media signal that differs from the media signal generated by the media signal source device 110. As a non-limiting example, a first key can be negotiated between the media signal source device 110 and the decryption circuitry 203, and a second key can be negotiated between the encryption circuitry 206 and the sink device 140. In this example, the first key can be used to encrypt communications between the media signal source device 110 and the decryption circuitry 203 while the second key can be used to encrypt the communications between the encryption circuitry 206. The encryption circuitry 206 can transmit the re-encrypted media signal to the sink device 140 through the sink port 127.

As an example, the encrypted media signal can be an encrypted TMDS signal using the HDCP technology. The decryption circuitry 203 and/or the encryption circuitry 206 can be an IC EP91A1K available from the Explore Microelectronics, Taiwan or another integrated circuit. The decrypted circuitry 203 can decrypt the encrypted TMDS signal. The decryption circuitry 203 can contain a HDCP key complying with HDCP 2.0 specification. The decryption circuitry 203 can decrypt the input HDCP-encrypted TMDS signal by using the HDCP technology. The encryption circuitry 206 can encrypt the un-encrypted TMDS signal by using the HDCP technology.

According to some embodiments, the transmit processing circuitry 128 and the receive processing circuitry 138 each include a computing device. In another embodiment, only one of the transmit processing circuitry 128 and the receive processing circuitry 138 includes a computing device. The decryption circuitry 203 can connect to the computing device in the transmit processing circuitry 128 and the encryption circuitry 20 can connect to the computing device in the receive processing circuitry 138. The connections to the computing devices can be through an inter-integrated circuit (I2C) bus. The computing device can control the decryption or encryption process of the TMDS signal. The computing device can perform framing operations on the low speed signals received from the source port 121 or the sink port 127 through an I2C bus.

In one example, the data recovery circuitry 209 can be a PS8401A available from the Parade Technologies, Ltd. The data recovery circuitry 209 can contain a clock and data recovery phase locked-loop (CDR PLL). The data recovery circuitry 209 can eliminate the clock jitter or data jitter in long-distance transmission. The data recovery circuitry 209 can improve the signal quality of the TMDS signal for outputting to the encryption circuitry 206.

The transmit processing circuitry 128 and the receive processing circuitry 138 can include a transmission circuit. According to one embodiment, the transmission circuit can be a transmission circuit as described in US20120210385A1, which is incorporated herein by reference in its entirety, or another transmission circuit. The high definition media signals can be extended from a source to a display over long distances using the transmission circuit. The transmission circuit can transmit low speed signals (framed low speed signals, power signals, etc) as common mode signals. The transmission circuit can transmit the TMDS signal as a differential mode signal.

High-frequency magnetic beads and center-tapped transformers can be used to couple the common mode signal and the differential mode signal for the transmission through the cable 154. Coupling two signals with high frequency beads and a center-tapped transformer may be not applicable in some applications, such as in an application which has a high requirement for real-time interaction of HDCP information, in which the common mode signal may have a transmission rate of Mbps which may cause interference between the common mode signal and the TMDS differential signal, thereby raising the requirement further for the high-frequency rejection of the high-frequency beads and center-tapped transformers.

As an example, when the media signal, which has a low resolution such as 480i, is input, the TMDS media signal can have a rate of 270 Mbps and a clock frequency of 27 MHz. In this example, the rate of the common mode signal in Mbps can near to the TMDS clock frequency, which may cause more troublesome interference. Thus, a high pass filter network including the center-tapped transformer, high-frequency beads, and high-frequency capacitors can require a high Q value, thereby making it difficult for selection of device and cost saving.

Figure 3:
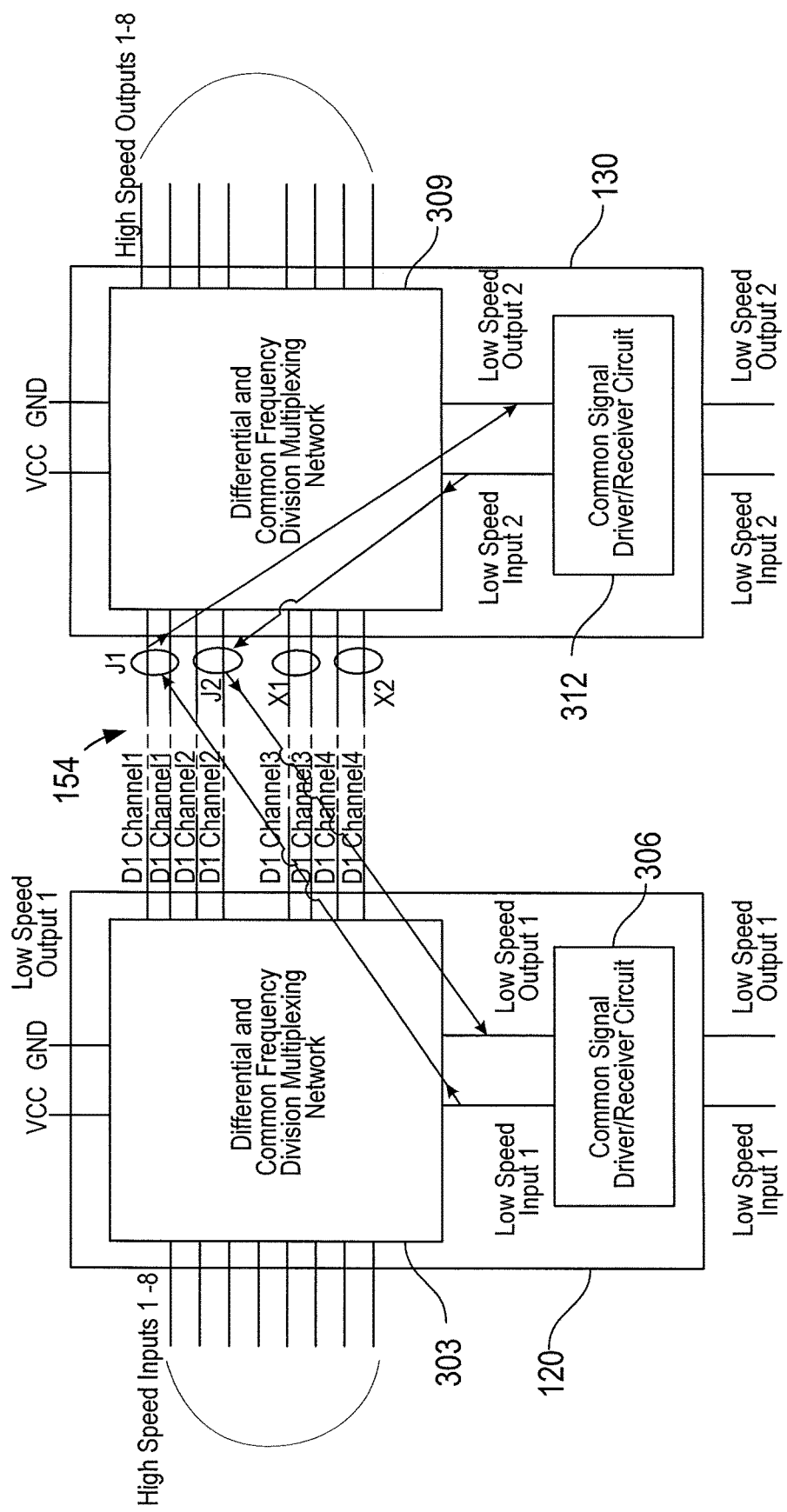
FIGS. 3-5 are block diagrams for realizing partial functions of connectivity system according to an example embodiment of the present disclosure.

FIG. 3 is a block diagram of for realizing partial functions of the extender system 100 according to an example of the present disclosure. The extender system 100 can transmit high speed signals, such as a high speed media signal or a high speed clock signal, and low speed signals, such a framing signal corresponding to low speed signals.

The cable 154 can include a plurality of twisted pair cables. The extender system 100 can transmit high and low speed signals through the plurality of twisted pair cables. The high speed signals are labeled as High Speed Inputs 1-8 and High Speed Output 1-8. The high speed signals can include a media signal and a clock signal which can both be transmitted in TMDS form. The media signal can be transmitted by using three twisted pair cables. The clock signal can be transmitted by using one twisted pair cable.

The low speed signals are labeled as Low Speed Input 1, Low Speed Input 2, Low Speed Output 1, and Low Speed Output 2. The low speed signals can be control signals which are transmitted through the source port 121 or the network port 124. The control signals can be a DDC control signal. The low speed signals can be control signals which are transmitted from an external device, such as an infrared input signal or an infrared output signal. The low speed signals can be received or transmitted through the IR transmit port 122, the IR receive port 123, the IR receive port 131, and the IR transmit port 129.

The transmit extender device 120 and the receive extender device 130 can respectively include a differential and common frequency division multiplexing network 303, 309. In each twisted pair cable, the differential and common frequency division multiplexing network 303, 309 can form a differential mode channel and a common mode channel. The DI channel1, DI channel2, DI channel3, and DI channel4 can be the differential mode channels. J1, J2, X1, and X2 can be the common mode channels, wherein the J1 and J2 common mode channels can be unidirectional channels.

A first unidirectional common mode channel J1 can be formed on the first twisted pair cables which are labelled as DI Channel1. A second unidirectional common mode channel J2 can be formed on the second twisted pair cables which are labelled as DI Channel2. Each of the differential mode channels can be used to transmit a pair of high speed signal. The first unidirectional common mode channel J1 can be used to transmit a low speed signal from the transmit extender device 120 to the receive extender device 130. The second unidirectional common mode channel J2 can be used to transmit a low speed signal from the receive extender device 130 to the transmit extender device 120.

The transmit extender device 120 and the receive extender device 130 can include a common signal driver/receiver circuit 306 and 312, respectively. The common signal driver/receiver circuit 306 and 312 can be used to conduct a first unidirectional common mode channel J1 and a second unidirectional common mode channel J2, respectively.

When a low speed signal is received by the transmit extender device 120 via Low Speed Input 1, the common signal driver/receiver circuit 306 can conduct the first unidirectional common mode channel J1 such that the low speed signal can be transmitted from the transmit extender device 120 to the receive extender device 130. When a low speed signal is to be sent out from the transmit extender device 120 via Low Speed Output 1, the differential and common frequency division multiplexing network 303 can conduct the second unidirectional common mode channel J2 such that the transmit extender device 120 can receive the low speed signal from the receive extender device 130.

When a low speed signal is to be sent out from the receive extender device 130 via Low speed Output2, the differential and common frequency division multiplexing network 309 can conduct the first unidirectional common mode channel J1 such that the receive extender device 130 can receive the low speed signal from the transmit extender device 120. When a low speed signal is received by the receive extender device 130 via Low Speed Input2, the common signal driver/receiver circuit 312 can conduct the second unidirectional common mode channel J2 such that the low speed signal can be transmitted from the receive extender device 130 to the transmit extender device 120.

The low speed signal can include multiple signal types. For example, the low speed signal can include an external bidirectional broadband 20-60 KHz IR signal and a communication signalling signal, or a low speed signal received from the source port 121 or the sink port 127. The low speed signal can be a display data channel (DDC) signal, a consumer electronic control (CEC) signal, a hot plug detect (HPD) signal, or another signal.

In one embodiment, the high-bandwidth digital content protection (HDCP) signal is not included in a display data channel (DDC) signal transmitted from the receive extender device 130 through the cable 154. In this embodiment, the low speed signals transmitted from the transmit extender device 120 to the receive extender device 130 can include one or more of the following signals: a CEC signal, an IR signal, a VCC signal, or a GND signal. The low speed signals transmitted from the receive extender device 130 to the transmit extender device 120 can include one or more of the following signals: a CEC signal, a HPD signal, a DDC signal, an IR signal, a VCC signal, or a GND signal.

The low speed signals can include a VCC signal and a GND signal. The differential and common frequency division multiplexing network 303 and 309 can form a first bidirectional common mode channel X1 on a third twisted pair cables labelled as DI Channel3 and form a second bidirectional common mode channel X2 on a fourth twisted pair cables labelled as DI Channel4. The first bidirectional common mode channel X1 and the second bidirectional common mode channel X2 can be used to transmit the power signal and the ground signal, respectively. The transmit extender device 120 can include some or all of the following modules: the source port 121, the decryption circuitry 203, the differential and common frequency division multiplexing network 303, the common mode signal driver/receiver circuit 306, the network port 124, or other modules.

Figure 4:
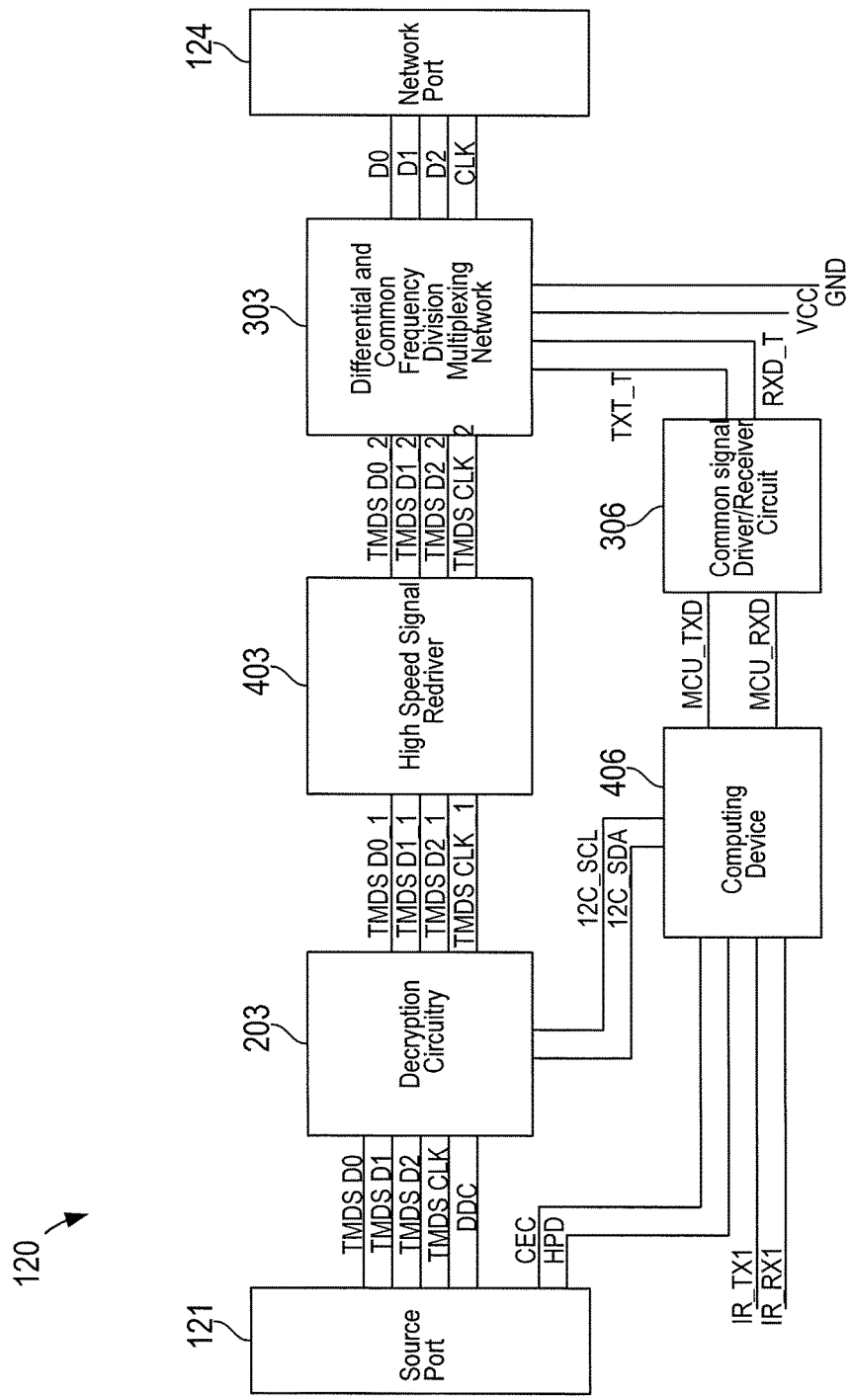

FIG. 4 is a block diagram for realizing partial functions of the transmit extender device 120 of the extender system 100 according to an example of the present disclosure. The transmit extender device 120 can include a high speed signal redriver 403 which is connected between the decryption circuitry 203 and the differential and common frequency division multiplexing network 303. The high speed signal redriver 403 can be an integrated circuit (IC) with a part number of MAX3814 provided by the Maxim Integrated Circuits Inc. The high speed signal redriver 403 can be used to reshape and amplify a TMDS signal for increasing the driving capability on the cable 154.

When the transmit extender device 120 transmits the low speed signals to the receive extender device 130, the transmit extender device 120 can perform a framing operation of the low speed signals to form a framed signal and transmit the framed signal to the receive extender device 130. When the receive extender device 130 receives the framed signal, the receive extender device 130 can perform a de-framing operation of the received framed signal to restore the low speed signals. The process for transmitting low speed signals from the receive extender device 130 to the transmit extender device 120 is similar to the above descriptions. Thus, the transmit extender device 120 can include a computing device 406 to perform a framing operation of the low speed signal to form a framed signal and transmit the framed signal to the receive extender device 130 through the first unidirectional common mode channel J1. The computing device 406 can perform a de-framing operation of the received framed signal transmitted from the second unidirectional common mode channel J2 so as to restore the low speed signals.

The functions of the computing device 406 can be implemented by a MCU or other processors with computing power. The computing device 406 can perform the framing operation by encoding control signals of all type and perform the de-framing operation by decoding the received framed signal. The frame can include a frame header field, a frame type field, a data frame length field, a data frame content field, and a CRC field. The frame type field is used to indicate the frame is a control signal data frame or a communication signalling frame. In the application, the control signal data frame can be an EDID data frame, a CEC data frame, a HPD notification frame, or an IR data frame. The communication signalling frame can be an ACK frame, a NACK frame, a Heartbeat frame, and a Data Request frame.

To ensure reliable communication and reduce frame transmission processing delay, a short frame architecture can be used. In one embodiment, the frame of the framed signal corresponding to the low speed signals cannot exceed 16 bytes and each frame can include a CRC field. The framed signal corresponding to the low speed signals can be the half-duplex frame which can be transmitted from the transmit extender device 120 to the receive extender device 130 through the first unidirectional common mode channel J1 or transmitted from the receive extender device 130 to the transmit extender device 120 through the second unidirectional common mode channel J2.

The transmit extender device 120 can receive TMDS signals and low speed signals through the source port 121, wherein the low speed signals are to be framed. The TMDS signals can include three pairs of encrypted media signals TMDS D0, TMDS D1, and TMDS D2, and one pair of clock signal TMDS CLK. The low speed signals can include a CEC signal and an IR signal.

The decryption circuitry 203 can receive the TMDS signals, and decrypt the received TMDS signals to generate a decrypted TMDS signals, wherein the decryption process can be controlled by the computing device 406. The high speed signal redriver 403 can receive the three pairs of decrypted media signals TMDS D0_1, TMDS D1_1, and TMDS D2_1 and one pair of clock signal TMDS CLK_1. The high speed signal redriver 403 can reshape and amplify the received signals to generate amplified signals TMDS D0_2, TMDS D1_2, TMDS D2_2, and TMDS CLK_2. The high speed signal redriver 403 can output the amplified signals to the differential and common frequency division multiplexing network 303.

The low speed signals received by the computing device 406 can include a signal directly inputted to the computing device 406 without passing through the decryption circuitry 203, such as the CEC signal. The low speed signals can further include a signal received from an external device interface, such as the IR_TX1. The computing device 406 can perform the framing operation of the low speed signals according to the frame structure shown in FIG. 8, and output the framed low speed signal MCU_TXD. The framed low speed signal MCU_TXD can be inputted to the common signal driver/receiver circuit 306. The common signal driver/receiver circuit 306 can conduct the first unidirectional common mode channel J1 to output the signal TXD_T to the differential and common frequency division multiplexing network 303. The signal TXD_T can corresponding to the framed low speed signal MCU_TXD.

The differential and common frequency division multiplexing network 303 can multiplex the amplified signals TMDS D0_2, TMDS D1_2, TMDS D2_2, and TMDS CLK_2 with the signal TXD_T. The amplified signals TMDS D0_2, TMDS D1_2, TMDS D2_2, and TMDS CLK_2 can be output from the high speed signal redriver 403. The signal TXD_T can be output from the common signal driver/receiver circuit 306. The low speed signals can include a power signal (VCC) and a ground signal (GND) to be transmitted to the differential and common frequency division multiplexing network 303. For the multiplexed signals D0, D1, D2, and CLK, four pairs of the differential signals (TMDS signals) can be transmitted to the network port 124 through the differential mode channels. At least one path of the common mode signal can be transmitted to the network port 124 through at least one common mode channel.

The differential and common frequency division multiplexing network 303 can receive a framed signal RXD_T corresponding to the low speed signals through the second unidirectional common mode channel J2. The framed signal RXD_T can be transmitted from the receive extender device 130. The differential and common frequency division multiplexing network 303 can transmit the framed signal RXD_T to the common signal driver/receiver circuit 306. The common signal driver/receiver circuit 306 can process the received framed signal RXD_T to generate a framed signal MCU_RXD and transmit the framed signal MCU_RXD to the computing device 406. The computing device 406 can perform a de-framing operation of the framed signal MCU_RXD to generate low speed signals. The generated low speed signals can include a CEC signal, a HPD signal, a DDC signal, an IR signals, and other signals. The generated low speed signals can be transmitted through corresponding output interfaces. For example, the IR_RX1 signal can be transmitted through the infrared interface, the CEC signal can be transmitted through the CEC signal line to the source port 121, and the EDID signal can be transmitted through the DDC signal line to the source port 121.

Figure 5:
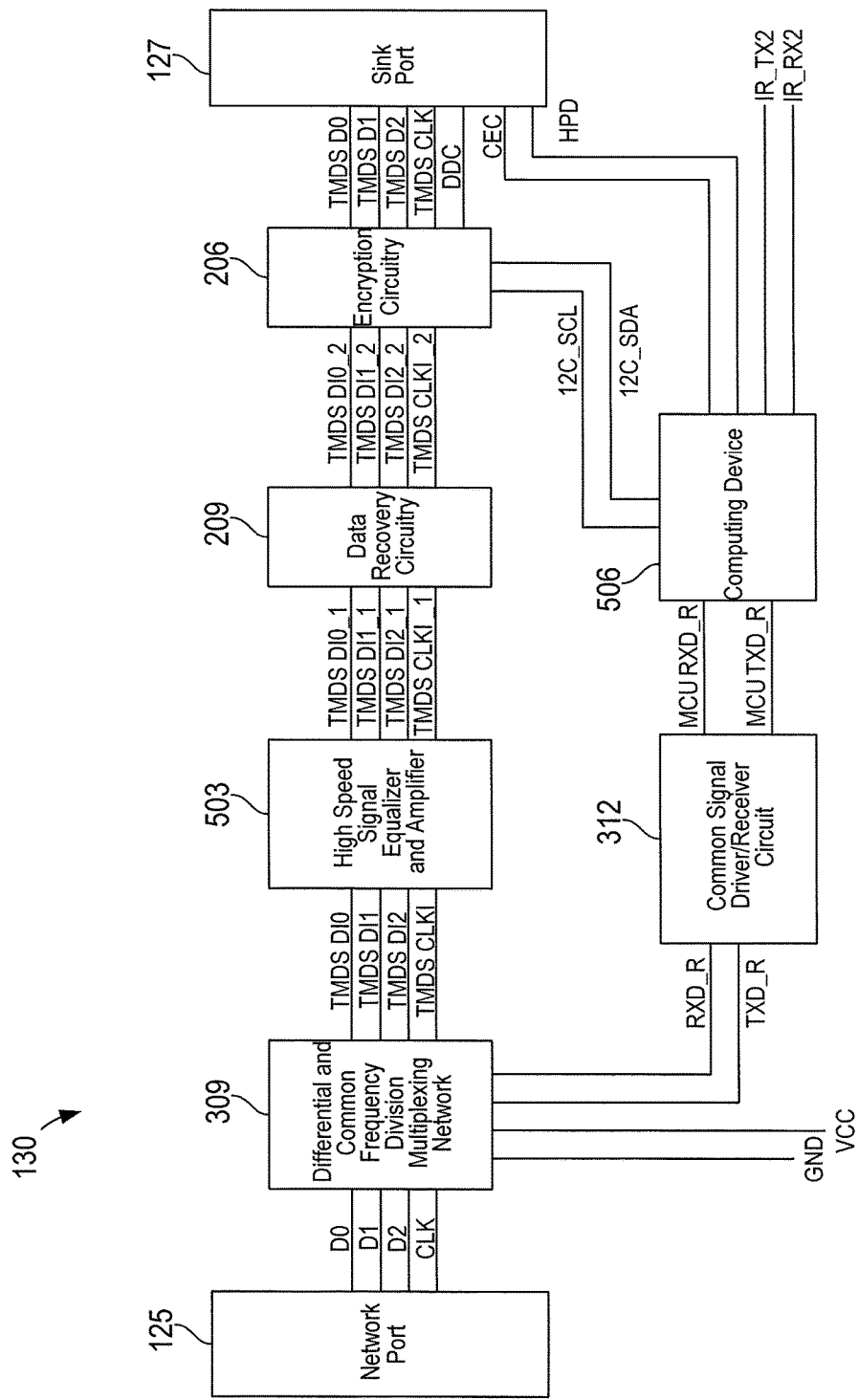

FIG. 5 is a block diagram for realizing partial functions of a receive extender device 130 of the extender system 100 according to an example the present disclosure. The receive extender device 130 can include a sink port 127, encryption circuitry 206, a differential and common frequency division multiplexing network 309, a common mode signal driver/receiver circuit 312, and a sink port 127.

The receive extender device 130 can include a high speed signal equalizer and amplifier 503. The high speed signal equalizer and amplifier 503 can be connected between the data recovery circuitry 209 and the differential and common frequency division multiplexing network 309. The high speed signal equalizer and amplifier 503 can be an integrated circuit (IC) with a part number of MAX3815 provided by the Maxim Integrated Circuits Inc. The high speed signal equalizer and amplifier 503 can be used to equalize and amplify TMDS signals for restoring the waveforms of the TMDS signals transmitted through an extended long distance cable. The high speed signal equalizer and amplifier 503 can support an adaptive automatic equalization.

The receive extender device 130 can include a computing device 506 to perform a de-framing operation of a framed low speed signal received through the first unidirectional common mode channel J1. The computing device 506 can perform a framing operation of low speed signals received from the media sink 13 or other external devices. The computing device 506 can transmit a framed signal corresponding to the received low speed signals to the second unidirectional common mode channel J2.

Figure 6:
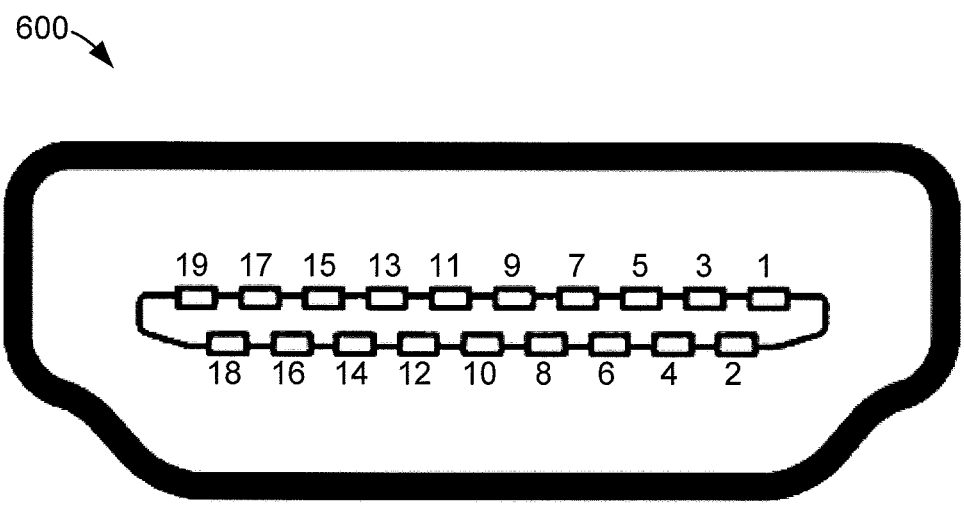
FIG. 6 is a drawing that depicts an example pinout of a high definition media interface (HDMI) port.

Turning to FIG. 6, an example pinout of an HDMI port 600 is illustrated. The HDMI port 600 can be relied upon in one or both of the transmit extender device 120 and the receive extender device 130 at the source port 121 and the sink port 127. Generally, in the transmit extender device 120 and receive extender device 130, the HDMI port 600 can be relied upon for connections to HDMI cables such as the cables 113 and 142. As illustrated in FIG. 6, the HDMI port 600 includes nineteen contacts or port pins. In other embodiments, the HDMI port 600 can include greater or fewer contacts. Table 2, below, provides a listing of the nineteen contacts or port pins in the HDMI port 600 and their corresponding HDMI signal names or pin identities. In Table 2, it can be appreciated that HDMI port 600 includes a plurality of contacts. A subset of the contacts including four pair of differential contacts, TMDS Data 0, 1, 2, and Clock.

TABLE 2

HDMI Jack Pinout

| HDMI Port Pin | HDMI Signal Identity |
|---|---|
| 1 | TMDS Data 2+ |
| 2 | TMDS Data 2 Shield− |
| 3 | TMDS Data 2− |
| 4 | TMDS Data 1+ |
| 5 | TMDS Data 1 Shield |
| 6 | TMDS Data 1− |
| 7 | TMDS Data 0+ |
| 8 | TMDS Data 0 Shield |
| 9 | TMDS Data 0− |
| 10 | TMDS Clock+ |
| 11 | TMDS Clock Shield |
| 12 | TMDS Clock− |
| 13 | CEC |
| 14 | Reserved |
| 15 | SCL |
| 16 | SDA |
| 17 | DDC/CEC Ground |
| 18 | +5 V Power |
| 19 | Hot Plug Detect |

Figure 7:
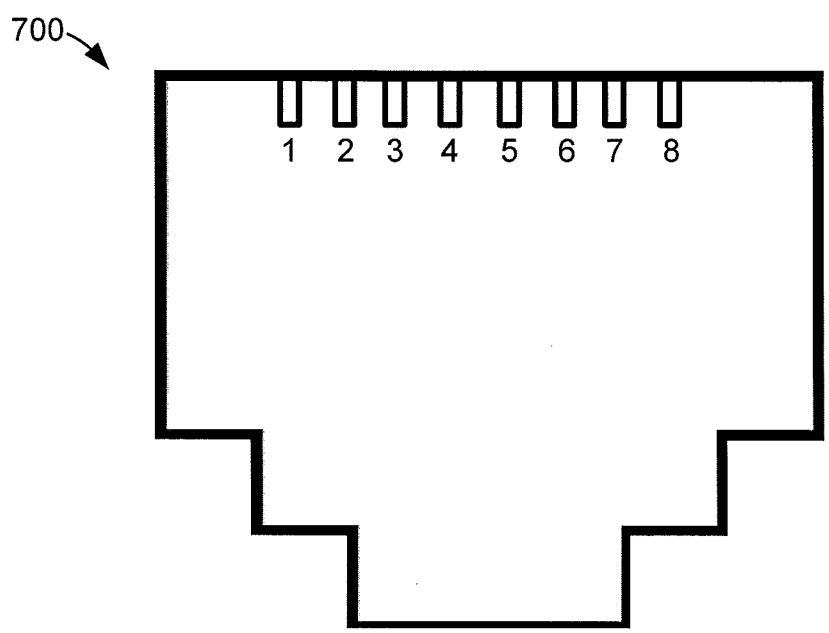
FIG. 7 is a drawing that depicts an example pinout of a multi-position multi-contact port.

FIG. 7 illustrates an example pinout of a network port 700. The network port 700 can be relied upon in one or both of the transmit extender device 120 and the receive extender device 130 at any or all of the network ports 124 and 125. Generally, in the transmit and receive extender devices 120 and 130, the network port 700 can be relied upon for connections to twisted pair cables such as the cable 154. As illustrated in FIG. 7, the network port 700 includes eight contacts or port pins. In other embodiments, the network port 300 can include greater or fewer contacts. Table 3 below provide listings of the eight contacts or port pins in the network port 700 and their corresponding signal names or pin identities according to the present disclosure. In Table 3, it can be appreciated that a network port 700 can include a plurality of contacts and, in some embodiments, four pairs of differential contacts, Diff Pair 0, 1, 2, and 3. It should be appreciated that Table 3 shows one of many configurations. In other embodiments, the positive voltage, transmit, receive, and ground can occupy any one of the four differential pairs.

TABLE 3

Port Pinout

| Port Pin | Conductor Identity | Signal Identity | Pin Function |
|---|---|---|---|
| 1 | Green/White | Diff Pair 0+ | +12 Volts |
| 2 | Green | Diff Pair 0− | +12 Volts |
| 3 | Orange/White | Diff Pair 1+ | Transmit |
| 4 | Blue | Diff Pair 2+ | Transmit |
| 5 | Blue/White | Diff Pair 2− | Receive |
| 6 | Orange | Diff Pair 1− | Receive |
| 7 | Brown/White | Diff Pair 3+ | Ground |
| 8 | Brown | Diff Pair 3− | Ground |

Figure 8:
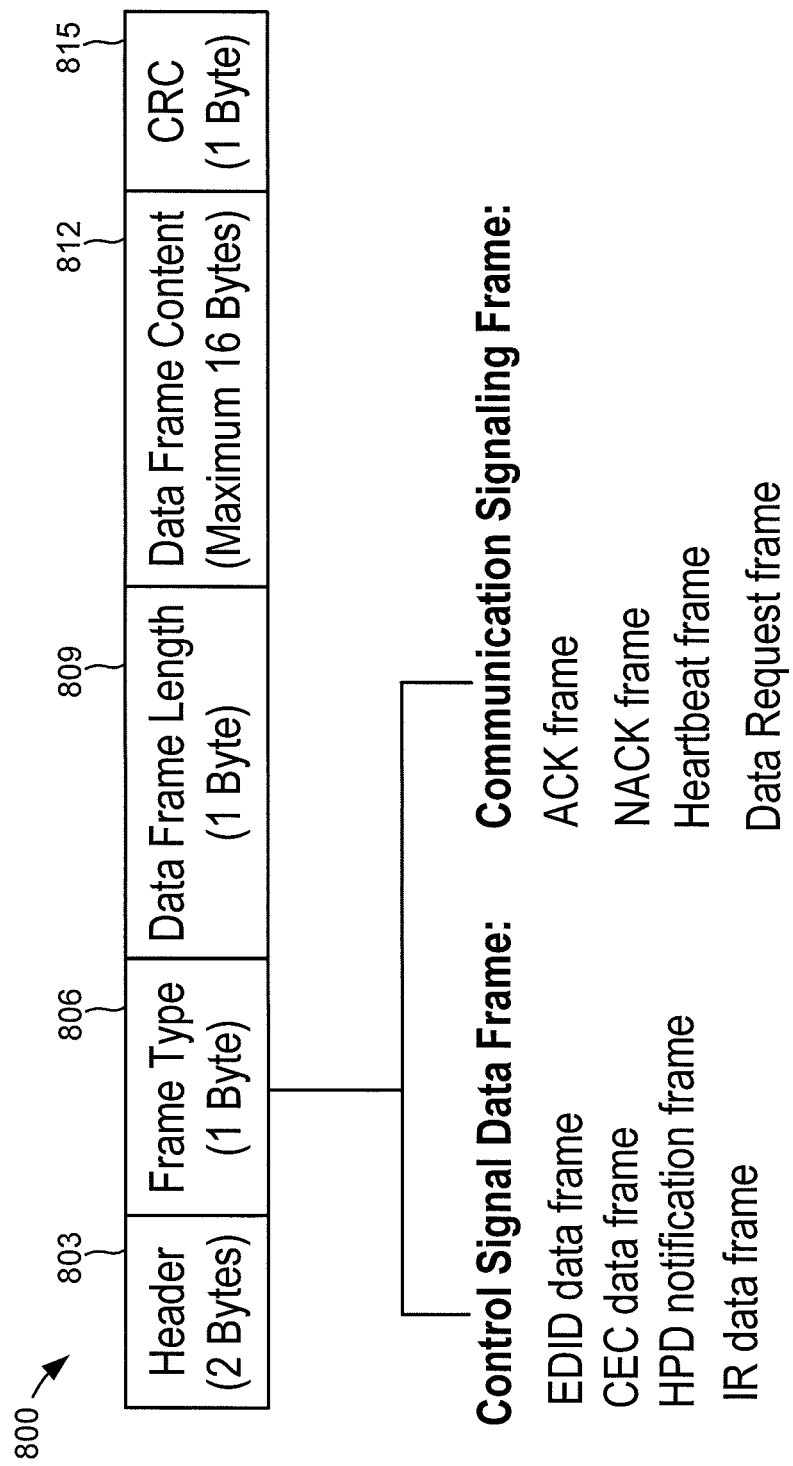
FIG. 8 is a schematic view of a frame structure of a framed low speed signal according to an example embodiment of the present disclosure.

With reference to FIG. 8, shown is a schematic view of a frame structure 800 of a framed message corresponding to the low speed signals according to various embodiments. The frame structure 800 can include a frame header field 803, a frame type field 806, a data frame length field 809, a data frame content field 812, and a CRC field 815.

The frame type field 806 can be used to indicate a framed message is a control signal data frame or a communication signalling frame. The control signal data frame can be an EDID data frame, a CEC data frame, a HPD notification frame, an IR data frame, or another control signal frame. The communication signaling frame can be an ACK frame, a NACK frame, a Heartbeat frame, a Data Request frame, or other communication frame.

The frame message that complies with the frame structure 800 can be generated by the transmit processing circuitry 128 and the receive processing circuitry 138. In some embodiments, the frame message is generated in computing device 406 or 506.

Figure 9:
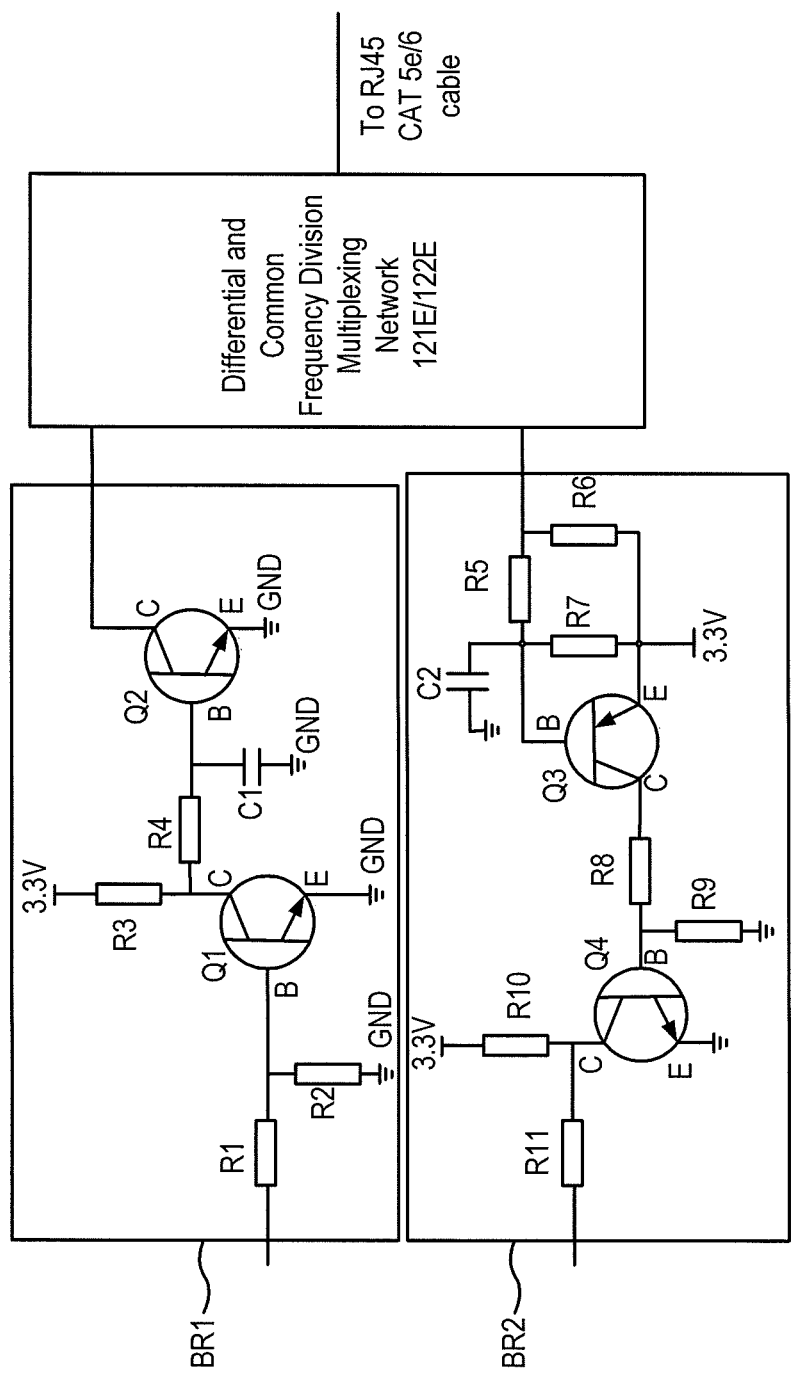
FIG. 9 is a schematic circuit of a common signal driver/receiver circuit according to an example embodiment of the present disclosure.

With reference to FIG. 9, shown is schematic circuit of a common signal driver/receiver circuit 306 and 312 according to the present disclosure. As an example, according to the transmission of high definition video signal disclosed in FIGS. 11A and 11B, (e.g. the transmission of un-encrypted high definition video signal through cable 154), the display data channel (DDC) signal transmitted from the computing device 506 does not include a high-bandwidth digital content protection (HDCP) signal. In one embodiment, the display data channel (DDC) signal can only include an EDID signal.

In another example, the DDC signal transmitted from the computing device 506 can include a DDC signal of other types. Without considering the transmission of the HDCP signal, the framed signal corresponding to low speed signals can be a unidirectional signal and the transmission rate of the framed signal may be not greater than 100 kbps. The circuit of the common signal driver/receiver circuit 306 can be the same as that of the common signal driver/receiver circuit 312. The common signal driver/receiver circuit 306/312 can include a first branch BR1 and a second branch BR2.

When the common signal driver/receiver circuit 306 receives a framed signal corresponding to low speed signals from the computing device 406, the common signal driver/receiver circuit 306 can turn on the first branch BR1 in order to transmit the received framed signal to the first unidirectional common mode channel J1. When the common signal driver/receiver circuit 312 receives a framed signal corresponding to low speed signals, the common signal driver/receiver circuit 312 can transmit the received framed signal through the second branch BR2 to the computing device 506 where a de-framing operation may be performed to the framed signal.

When the common signal driver/receiver circuit 312 receives a framed signal corresponding to control signals from the computing device 506, the common signal driver/receiver circuit 312 can turn on the first branch BR1 in order to transmit the framed signal to the first unidirectional common mode channel J1. When the common signal driver/receiver circuit 306 receives a framed signal corresponding to low speed signals, the common signal driver/receiver circuit 306 can transmit the received framed signal through the second branch BR2 to the computing device 406 where the computing device 406 can perform a de-framing operation to the framed signal.

In an example, the first branch BR1 can include a first resistor R1, a second resistor R2, a third resistor R3, a fourth resistor R4, a first transistor Q1, a second transistor Q2, and a first filter capacitor C1. In one embodiment, the first transistor Q1 and the second transistor Q2 can be transistors with a part number of 3904 NPN.

One end of the first resistor R1 can be connected to an output end of the computing device 406 or an output end of the computing device 506, the other end of the first resistor R1 can be connected to one end of the second resistor R2 and a base B of the first transistor Q1. The other end of the second resistor R2 can be connected to the ground signal GND. An emitter E of the first transistor Q1 can be connected to the ground signal, and a collector C of the first transistor Q1 can be connected to one end of the third resistor R3 and one end of the fourth resistor R4. The other end of the third resistor R3 can be connected to a power signal. In one embodiment, the power signal is 3.3V. The other end of the fourth resistor R4 can be connected to one end of the first filter capacitor C1 and a base B of the second transistor Q2. An emitter E of the second transistor Q2 can be connected to the ground signal GND and a collector C of the second transistor Q2 can be connected to an input end of the differential and common frequency division multiplexing network 303 or 309. The filter capacitor C1 can be connected between the base B of the second transistor Q2 and the ground.

According to one example, the second branch BR2 can include a fifth resistor R5, a sixth resistor R6, a seventh resistor R7, an eighth resistor R8, a ninth resistor R9, a tenth resistor R10, an eleventh resistor R11, a third transistor Q3, a fourth transistor Q4, and a second filter capacitor C2. In this example, the third transistor Q3 can be be the transistor with the part number of 3906 PNP, and the fourth transistor Q4 can be the transistor with the part number of 3904 NPN.

One end of the fifth resistor R5 can be connected to the differential and common frequency division multiplexing network 303 or 309 and one end of the sixth resistor R6. The other end of the fifth resistor R5 can be connected to one end of the seventh resistor R7, a base B of the third transistor Q3, and one end of the second filter capacitor C2. The other end of the sixth resistor R6 can be connected to the power signal 3.3V, the other end of the seventh resistor R7, and an emitter E of the third transistor Q3. The other end of the second filter capacitor C2 can be connected to the ground signal. A collector of the transistor Q3 can be connected to one end of the eighth resistor R8. The other end of the eighth resistor R8 can be connected to one end of the ninth resistor R9 and a base B of the fourth transistor Q4. The other end of the ninth resistor R9 is connected to the ground signal GND. An emitter E of the fourth transistor Q4 can be connected to the ground signal GND. A collector C of the fourth transistor Q4 can be connected to one end of the tenth resistor R10 and one end of the eleventh resistor R11. The other end of the tenth resistor R10 can be connected to the power signal 3.3V. The other end of the eleventh resistor R11 can be connected to the computing device 406 or the computing device 506.

When the transmit extender device 120 transmits a framed signal corresponding to low speed signals to the receive extender device 130, in the transmit extender device 120, the framed signal can be output by the computing device 406 to a voltage divider. The voltage divider can include the first resistor R1 and the second resistor R2. The output of the voltage divider can be amplified by the first transistor Q1. The output signal of the first transistor Q1 can be transmitted to the fourth resistor R4 and the first filter capacitor C1 so as to filter out the noise. The filtered signal can be transmitted to the second transistor Q2. The second transistor Q2 can amplify the filtered signal and output the amplified filtered signal to the differential and common frequency division multiplexing network 303. In the receive extender device 130, the differential and common frequency division multiplexing network 309 can receive the framed signal corresponding to low speed signals and transmit the received framed signal to the second branch BR2. The fifth resistor R5, the sixth resistor R6, and the seventh resistor R7 can adjust the current of the received framed signal to complete a conversion from a current signal to a voltage signal. The fourth transistor Q4 can reshape the received signal and transmit the reshaped signal to the the computing device 506 for performing a de-framing operation.

When the receive extender device 130 transmits a framed signal corresponding to low speed signals to the transmit extender device 120, the framed signal can be output by the computing device 506 to a voltage divider. The voltage divider can include the first resistor R1 and the second resistor R2. The output of the voltage divider can be amplified by the first transistor Q1. The output signal of the first transistor Q1 can be transmitted to the fourth resistor R4 and the first filter capacitor C1 to filter out the noise. The filtered signal can be transmitted to the second transistor Q2. The second transistor Q2 can amplify the filtered signal and output the amplified filtered signal to the differential and common frequency division multiplexing network 303.

The differential and common frequency division multiplexing network 303 can receive the framed signal corresponding to low speed signals and transmit the received framed signal to the second branch BR2. The fifth resistor R5, the sixth resistor R6, and the seventh resistor R7 can adjust the current of the received framed signal to complete a conversion from a current signal to a voltage signal. The fourth transistor Q4 can reshape the received signal and transmit the reshaped signal to the the computing device 406 for performing a de-framing operation.

The fourth resistor R4 and the first filter capacitor C1 in the first branch BR1 as well as the fifth resistor R5 and the second filter capacitor C2 in the second branch BR2 can be RC filters that can adjust the waveform of the framed signal. As a result of the current-driven and current-reception, the circuit can have a low sensitivity to the impedance variations of the transmission line. The transistors can be an integrated circuit with part numbers of 3904 and 3906, among other transistors.

Figure 10:
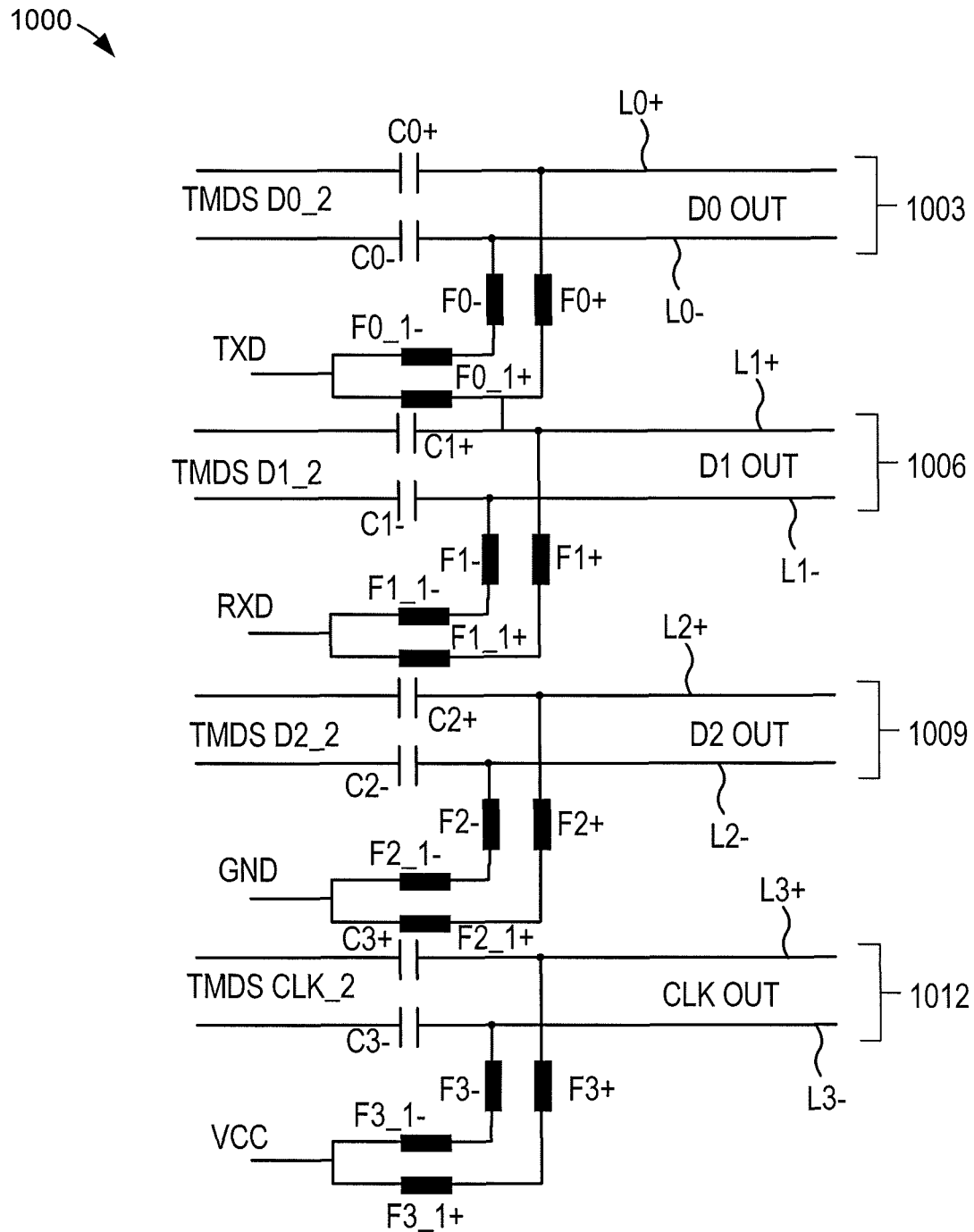
FIG. 10 is a schematic circuit of a differential and common frequency division multiplexing network according to an example embodiment of the present disclosure.

Turning to FIG. 10, shown is a schematic circuit 1000 of a differential and common frequency division multiplexing network 303 or 309 according to the present disclosure. In some embodiments, the differential and common frequency division multiplexing network 303 and the differential and common frequency division multiplexing network 309 have the same circuit structure. The differential and common frequency division multiplexing network 303/309 can use a high frequency magnetic bead and a high frequency capacitor to implement the separation of the common mode signal and the TMDS signals. As shown, in some embodiments the schematic circuit 1000 does not include a transformer, thus the cost can be reduced dramatically.

Because the DDC signal cannot contain a HDCP signal, the transmission rate of the framed signal corresponding to low speed signals can be only few ten kbps. The bandwidth of the common mode channel may only be 100 kbps and satisfy the requirements. The transmission rate of the TMDS signals is not less than 270 Mbps. Because the transmission rate of the common mode signals and the transmission rate of the TMDS signals have a large difference, thus the requirements for the high frequency bead and the high frequency capacitor may be relaxed and the transmission quality of the TMDS signals may be unaffected by the common mode signals.

The differential and common frequency division multiplexing network 303/309 shown in FIG. 3 can include four twisted pair cables 1003, 1006, 1009, and 1012. Each twisted pair cable can include two capacitors, and each capacitor can be connected to one of the wires of the twist pair cable. As shown in FIG. 10, the capacitors C0+ and C0− are located at the first twisted pair cable 1003, the capacitors C1+ and C1− are located at the second twisted pair cable 1006, and so on. The positive polar of the high speed media signal can be transmitted to the conductor wire L0+ of the twisted pair cable 1003 through the positive polar capacitor C0+, and the negative polar of the high speed media signal can be transmitted to the other conductor wire L0− of the twisted pair cable 1003 through the negative polar capacitor C0−. Each capacitor can be connected to high frequency beads in parallel to form a LC multiplexing network.

The ends of the two high frequency beads on the positive and negative wires are connected to form a single end in order to receive the common mode signal. As shown in FIG. 10, two high frequency beads can be connected in series to form a single high frequency bead. That is, the high frequency beads F0− and F0_1− can be connected in series to form a single high frequency bead, and the high frequency beads F0+ and F0_1+ can be connected in series to form a single high frequency bead. One end of the high frequency bead F0_1+ and one end of the high frequency bead F0_1− can be connected to form a single end in order to receive the common mode signal TXD. The other twisted pair cables can have same structure as the twisted pair cable 1003.

The transmit extender device 120 can use the first unidirectional common mode channel J1 to transmit a framed signal TXD corresponding to low speed signals to the receive extender device 130. The first bidirectional common mode channel X1 and the second bidirectional common mode channel X2 can be used to transmit a power signal VCC and a ground signal GND, respectively. The receive extender device 130 can use the second unidirectional common mode channel J2 to transmit a framed signal RXD corresponding to low speed signals to the transmit extender device 120. Four differential mode channels can be used to transmit three pairs of high speed media signals TMDS D0_2, TMDS D1_2, and TMDS D2_2, and one pair of high speed clock signal TMDS CLK_2.

In one embodiment, the transmission rate of the framed signals RXD and TXD is less than or equal to 100 kbps. The framed signals RXD and TXD can be multiplex into a high speed differential mode channel. The high speed differential mode channel can be used to transmit TMDS signals. The impedance values of the high frequency beads F0+, F0−, F0_1+, F0_1−, F1+, F1−, F1_1+, and F1_1− at 100 MHz can be 1K ohm to 2K ohm. In some embodiments, the impedance values of the high frequency beads F0+, F0−, F0_1+, F0_1−, F1+, F1−, F1_1+, and F1_1− at 1000 MHz can be over 300 ohm. These impedance values can ensure the high frequency beads F0+, F0−, F0_1+, F0_1−, F1+, F1−, F1_1+, and F1_1− represent high impedance corresponding to the TMDS signals and represent low impedance corresponding to the low speed signals.

The values of the capacitors C0+, C0−, C1+, and C1− can range from 1000 pF to 10 nF. These values can ensure the capacitors C0+, C0−, C1+, and C1− represent high impedance corresponding to the low speed signals and represent low impedance corresponding to the TMDS signals. The lowest transmission rate of the TMDS signals can be 270 Mbps. The signal VCC can provide a power supply and the GND signal can provide a common ground. The signals VCC and GND can be multiplex into a high speed differential mode channel. The high speed differential mode channel can be used to transmit TMDS signals. In one embodiment, the signals VCC and GND can provide 12 volts of power. The loading current can achieve 200 mA to 300 mA of current. The loading current can pass through the high frequency beads F2+, F2−, F2_1+F2_1−, F3+, F3−, F3_1+, and F3_1− with the rated current being greater than 500 mA.

The high frequency beads can have an impedance of 50% in the condition of current loading. The loading current can pass through the high frequency beads F2+, F2−, F2_1+, F2_1−, F3+, F3−, F3_1+, and F3_1− with the impedance value of 1K ohm at 100 MHz and the impedance value of 300 ohm at 1000 MHz. The loading current can also pass through the capacitor C2+ and C2− with the values in the range of 20 nF to 100 nF and the capacitor C3+ and C3− with the values being greater than 100 nF. In one embodiment, the upper limit of voltage of the capacitors C3+ and C3− must exceed the value of the power signal VCC.

As shown in FIG. 10, the power signal VCC can be multiplex transmitted with the TMDS clock signal by the differential and common frequency division multiplexing network 303/309 because of the isolating functions provided by the high frequency beads and capacitors included in the differential and common frequency division multiplexing network 303/309. Similarly, the common ground signal GND can be multiplex transmitted with the TMDS media signal by the differential and common frequency division multiplexing network 303/309. The frequency of the power signal VCC and the common ground signal GND can have large differences from the frequency of the TMDS signals. Thus the requirements of the high frequency beads and capacitors can be relaxed. That is, any high frequency beads and any capacitors can be applicable as long as the rated current is in the design range and the impedance meets the requirement to isolate the TMDS signals from the power signal and the ground signal.

Figure 11A:
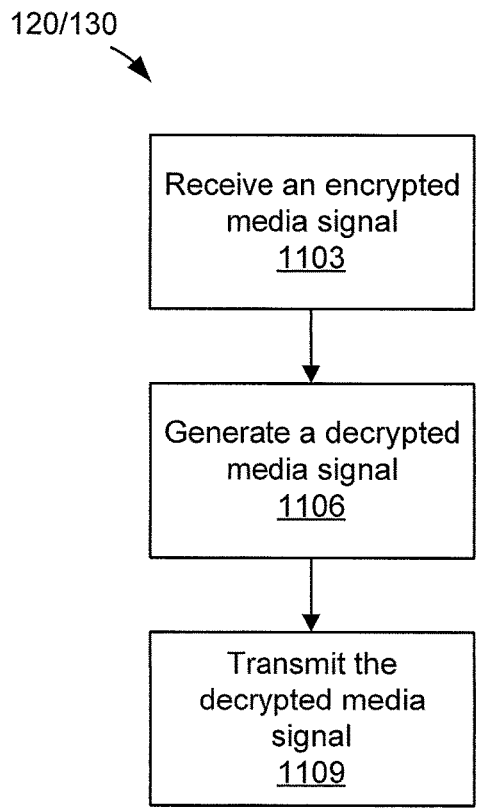
FIGS. 11A and 11B are example flowcharts of certain functionality implemented by portions of connectivity system of FIG. 1 according to various embodiments of the present disclosure.
Figure 11B:
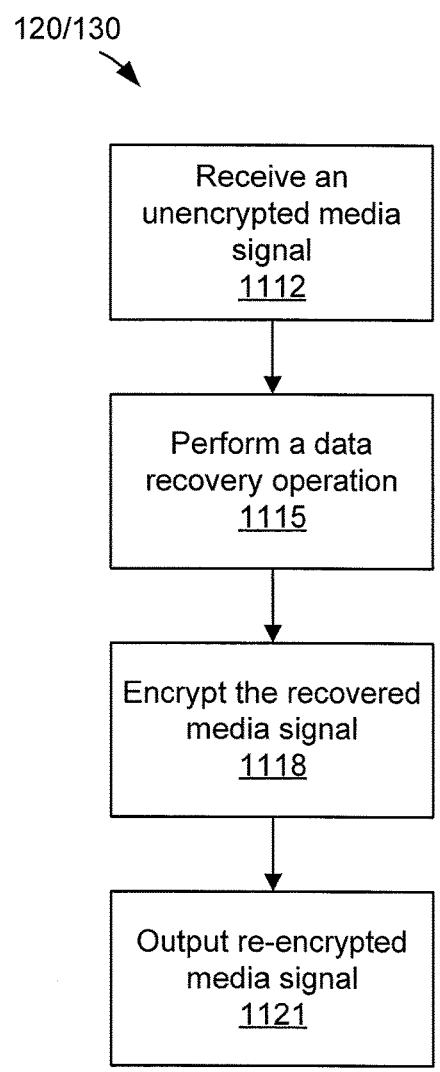

Before turning to the process flow diagrams of FIGS. 11A and 11B, it is noted that embodiments described herein may be practiced using an alternative order of the steps illustrated in FIGS. 11A and 11B. That is, the process flows illustrated in FIGS. 11A and 11B are provided as examples only, and the embodiments may be practiced using process flows that differ from those illustrated. Additionally, it is noted that not all steps are required in every embodiment. In other words, one or more of the steps may be omitted or replaced, without departing from the spirit and scope of the embodiments. Further, steps can be performed in different orders, in parallel with one another, or omitted entirely, and/or certain additional steps may be performed without departing from the scope and spirit of the embodiments. Although the flowcharts are primarily discussed with reference to either transmit extender device 120 or receive extender device 130, both the transmit extender device 120 and receive extender device 130 can perform all of the functionality described herein.

FIG. 11A is a flowchart of a method for receiving and transmitting an media signal in a transmit extender device 120 or a receive extender device 130 according to an example of the present disclosure. At block 1103, the transmit extender device 120 or a receive extender device 130 can receive an encrypted media signal. The media signal source device 110 can transmit the encrypted media signal to the transmit extender device 120 through the cable 113. The encrypted media signal can be compliant with a high-bandwidth digital content protection (HDCP) specification. The encrypted media signal can also be encrypted with other encryption methods. The encrypted media signal can enter into the transmit extender device 120 through a TMDS signal line connected to the source port 121. The sink device 140 can transmit the encrypted media signal to the receive extender device 130. The encrypted media signal can also enter into the receive extender device 120 through a TMDS signal line connected to the sink port 127.

At block 1106, the transmit extender device 120 or receive extender device 130 can generate a decrypted media signal. As an example, the transmit extender device 120 can decrypt the encrypted media signal in the decryption circuitry 203 to generate a decrypted media signal. According to one embodiment, the receive extender device 130 includes decryption circuitry similar to decryption circuitry 203. In this embodiment, the receive extender device 130 can generate a decrypted media signal from the encrypted media signal similar to the transmit extender device 120.

At block 1109, the transmit extender device 120 or receive extender device 130 can transmit the decrypted media signal. The transmit extender device 120 can transmit the decrypted media signal through the cable 154 to the receive extender device 130 or vice versa. The high speed signal red river 403 can reshape and amplify the decrypted media signal for increasing the driving capability on the cable 154. The decrypted media signal can be transmitted on the cable 154 over a bidirectional common mode channel between the differential and common frequency division multiplexing networks 303 and 309.

In transmission, problems such as jitter or packet loss can exist on the cable 154. If the media signal transmitted in the cable was encrypted, the receive extender device 130 can experience errors decrypting an encrypted signal, resulting in image flash. If the media signal transmitted in the cable 154 is not encrypted, even if the jitter or packet loss occurs, only a few image pixels may be affected. Besides, the receive extender device 130 can performed a data recovery operation of the decrypted media signal to restore the affected image pixels. Thus, image flicker can be avoided.

In addition to a decrypted media signal, the cable 154 can carry a power signal, a ground signal, and a framing signal. The power signal, ground signal, and framing signal can be referred to as low speed signals. The transmit extender device 120 can receive and transmit low speed signals through network port 124 or other interfaces such as an infrared interface, and so on. The receive extender device 130 can output low speed signals to the sink device 140 or receive these low speed signals from an external device through the sink port 127 or through other interfaces such as an infrared interface or other peripheral interface, and so on.

The low speed signals that enter or exit through the source port 121 or the network port 124 can include a DDC signal. The signals transmitted over the cable 154 are un-encrypted signals, and the transmit extender device 130 and the receive extender device 130 can interact without a HDCP key information associated with the decryption. The transmit extender device 120 can operate without transmitting a DDC signal to the receive extender device 130, and the DDC signal transmitted from the receive extender device 130 to the transmit extender device 120 can omit or exclude HDCP key information.

Turning to FIG. 11B, shown is a flowchart of a method for receiving and transmitting a media signal in a receive extender device 130 or a transmit extender device 120 and output a media signal to a sink device according to an example of the present disclosure. At block 1112, the receive extender device 130 can receive an unencrypted media signal. As an example, the receive extender device 130 can receive the decrypted media signal transmitted in block 1109 of FIG. 11A.

At block 1115, the receive extender device 130 can perform a data recovery operation on the unencrypted media signal to generate a recovered media signal. The recovered media signal can be output by the data recovery circuitry 209. In one example, the signal transmitted through the TDMS signal line can include a clock signal. The clock signal can be transmitted through the cable 154 without being encrypted. After receiving the clock signal, the receive extender device 130 can perform a data recovery operation with the received clock signal. In one example, the data recovery operation of the media signal or the clock signal can include a jitter process or a packet loss process.

At block 1118, the receive extender device 130 can encrypt the recovered media signal to generate an encrypted media signal, which is referred to herein as a re-encrypted media signal. The encryption circuitry 206 can receive the recovered media signal from data recovery circuitry 209 and encrypt the recovered media signal to generate the re-encrypted media signal. The re-encrypted media signal can be HDCP compliant.

At block 1121, the receive extender device 130 can output the re-encrypted media signal. As an example, the encryption circuitry 206 can output the re-encrypted media signal to sink port 127. The re-encrypted media signal can travel through cable 142 to the sink device 140. In one example, the sink device 140 can render media corresponding to the re-encrypted media signal on a display device. In this example, the rendered media can also correspond to the encrypted media signal received in block 1103.

Figure 12:
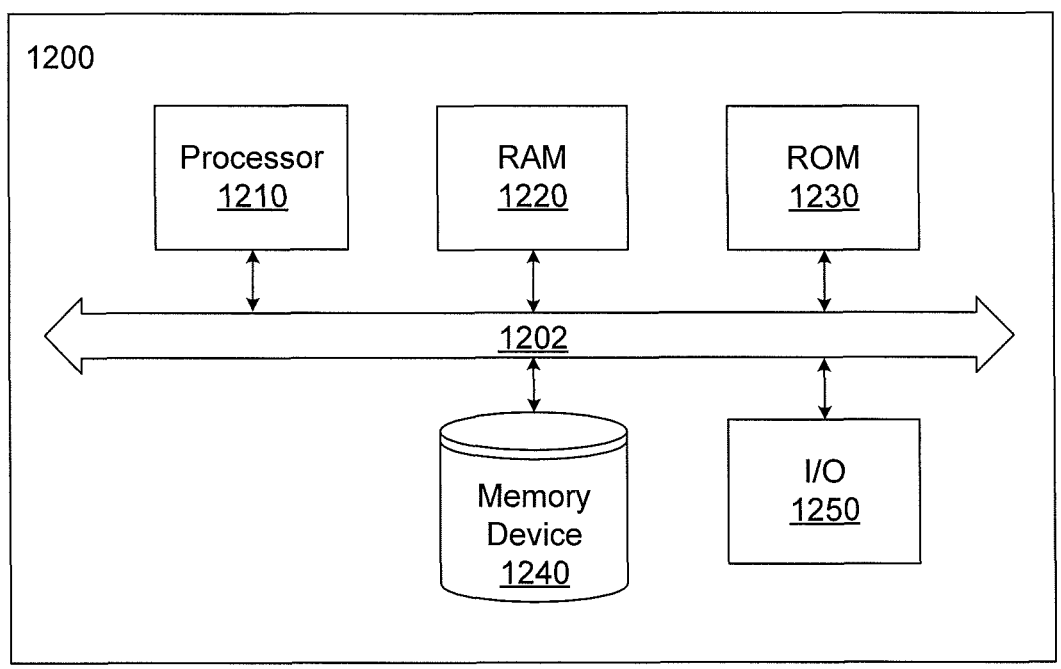
FIG. 12 is a schematic block diagram that illustrates an example computing environment employed in the connectivity system of FIG. 1 according to various embodiments.

Turning to FIG. 12, an example hardware diagram of a computing device 1200 is illustrated. Any of the computing device 406 or computing device 506 can be implemented, in part, using one or more elements of the computing device 1200. The computing device 1200 includes a processor 1210, a Random Access Memory ("RAM") 1220, a Read Only Memory ("ROM") 1230, a memory device 1240, a network interface 1250, and an Input Output ("I/O") interface 1260. The elements of the computing device 1200 are communicatively coupled via a bus 1202.

The processor 1210 comprises any well known general purpose arithmetic processor or Application Specific Integrated Circuit ("ASIC"). The RAM and ROM 1220 and 1230 comprise any well known random access or read only memory device that stores computer-readable instructions to be executed by the processor 1210. The memory device 1240 stores computer-readable instructions thereon that, when executed by the processor 1210, direct the processor 1210 to execute various aspects of the present invention described herein. When the processor 1210 comprises an ASIC, the processes described herein may be executed by the ASIC according to an embedded circuitry design of the ASIC, by firmware of the ASIC, or both an embedded circuitry design and firmware of the ASIC. As a non-limiting example group, the memory device 1240 comprises one or more of an optical disc, a magnetic disc, a semiconductor memory (i.e., a semiconductor, floating gate, or similar flash based memory), a magnetic tape memory, a removable memory, combinations thereof, or any other known memory means for storing computer-readable instructions. The network interface 1250 comprises hardware interfaces to communicate over data networks. The I/O interface 1260 comprises device input and output interfaces such as keyboard, pointing device, display, communication, and other interfaces. The bus 1202 electrically and communicatively couples the processor 1210, the RAM 1220, the ROM 1230, the memory device 1240, the network interface 1250, and the I/O interface 1260, so that data and instructions may be communicated among them.

In operation, the processor 1210 is configured to retrieve computer-readable instructions stored on the memory device 1240, the RAM 1220, the ROM 1230, or another storage means, and copy the computer-readable instructions to the RAM 1220 or the ROM 1230 for execution, for example. The processor 1210 is further configured to execute the computer-readable instructions to implement various aspects and features of the present invention. For example, the processor 1210 may be adapted and configured to execute the processes described above with reference to FIG. 11, including the processes described as being performed by the modules of the transmit extender device 120 and receive extender device 130. Also, the memory device 1240 may store data in a database either remotely on locally on computing device 1200.

A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z). Similarly, "at least one of X, Y, and Z," unless specifically stated otherwise, is to be understood to present that an item, term, etc., can be either X, Y, and Z, or any combination thereof (e.g., X, Y, and/or Z). Thus, as used herein, such phrases are not generally intended to, and should not, imply that certain embodiments require at least one of either X, Y, or Z to be present, but not, for example, one X and one Y. Further, such phrases should not imply that certain embodiments require each of at least one of X, at least one of Y, and at least one of Z to be present.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Therefore, at least the following is claimed:

1. A transmit connectivity device, comprising:
a high definition media interface (HDMI) port;
signal processing circuitry configured to at least:
receive a media signal from at least one source device coupled to the HDMI port;
convert the media signal to a converged media signal based on a converged signal specification;
perform a framing operation on control signals to form a framed signal; and
transmit the framed signal over at least one unidirectional common mode channel;
a multi-position multi-contact port having a first plurality of contacts coupled to the signal processing circuitry to transmit the converged media signal to a receive connectivity device, the receive connectivity device configured to convert the converged media signal to another media signal based on the converged signal specification and to output the media signal via a second HDMI port of the receive connectivity device to at least one sink device; and
the multi-position multi-contact port having a second plurality of contacts coupled to a power device comprising a power source and a ground.

2. The transmit connectivity device according to claim 1, wherein the converged signal comprises the framed signal, and the at least one unidirectional common mode channel comprises at least one plurality of contacts belonging to both the first plurality of contacts and the second plurality of contacts.

3. The transmit connectivity device according to claim 1, wherein the signal processing circuitry comprises a decryption circuit and a differential and common frequency division multiplexing network.

4. The transmit connectivity device according to claim 3, wherein the signal processing circuitry comprises a high speed signal redriver circuit coupled to the decryption circuit and the differential and common frequency division multiplexing network, the high speed signal redriver circuit configured to reshape and amplify a transition-minimized differential signaling (TMDS) signal.

5. The transmit connectivity device according to claim 3, wherein the media signal is encrypted based at least in part on a high-bandwidth digital content protection (HDCP) specification and the decryption circuit is configured to generate the converged media signal by decrypting the media signal.

6. The transmit connectivity device according to claim 1, wherein the power source is coupled to a first contact and a second contact of the second plurality of contacts.

7. The transmit connectivity device according to claim 6, wherein the first contact and the second contact correspond to a twisted pair of wires.

8. The transmit connectivity device according to claim 1, wherein the media signal comprises at least one of uncompressed high definition video, digital audio, control, or data signals.

9. The transmit connectivity device according to claim 1, wherein the signal processing circuitry is configured to receive uncompressed high definition video, digital audio, control, and data signals from the at least one source device and to convert the uncompressed high definition video, digital audio, control, and data signals to the converged media signal based on the converged signal specification.

10. The transmit connectivity device according to claim 1, wherein a power connector is electrically coupled to the second plurality of contacts of the multi-position multi-contact port and the power device is connected to the power connector.

11. The transmit connectivity device according to claim 1, wherein the signal processing circuitry receives power from the receive connectivity device via the second plurality of contacts of the multi-position multi-contact port.

12. A receive connectivity device, comprising:
a high definition media interface (HDMI) port;

signal processing circuitry configured to at least:
  receive a converged media signal;
  convert the converged media signal to a media signal based on a converged signal specification;
  perform a de-framing operation on a framed signal to generate a control signal, the converged media signal comprising the framed signal; and
  output the media signal via the HDMI port;
a multi-position multi-contact port having a plurality of contacts coupled to the signal processing circuitry to receive the converged media signal from a transmit connectivity device, wherein the transmit connectivity device receives a source media signal from at least one source device via another HDMI port and transmits the converged media signal to the receive connectivity device via the multi-position multi-contact port based at least in part on the source media signal;
the multi-position multi-contact port connectivity having at least one contact configured to receive a power supply from the transmit connectivity device via a cable connected to the multi-position multi-contact port; and
the multi-position multi-contact port having at least one contact configured to receive a ground via the cable.

13. The receive connectivity device according to claim 12, wherein the signal processing circuitry comprises a data recovery circuit and an encryption circuit.

14. The receive connectivity device according to claim 13, wherein the data recovery circuit generates a recovered media signal by eliminating at least one of clock jitter or data jitter from the converged media signal, and the encryption circuit encrypts the recovered media signal to generate the media signal.

15. The receive connectivity device according to claim 12, wherein the power supply is coupled to a first contact and a second contact of the multi-position multi-contact port.

16. The receive connectivity device according to claim 15, wherein the first contact and the second contact correspond to a twisted pair of wires.

17. The receive connectivity device according to claim 12, wherein the ground is coupled to a seventh contact and an eighth contact of the multi-position multi-contact port.

18. The receive connectivity device according to claim 17, wherein the seventh contact and the eighth contact correspond to a twisted pair of wires.

19. The receive connectivity device according to claim 12, wherein the media signal comprises at least one of uncompressed high definition video, digital audio, control, or data signals.

20. The receive connectivity device according to claim 12, wherein the signal processing circuitry is configured to receive uncompressed high definition video, digital audio, control, and data signals from the at least one source device and to convert the uncompressed high definition video, digital audio, control, and data signals to the converged media signal based on the converged signal specification.

* * * * *